April 1, 1930.  W. C. BRUMDER  1,752,832
MIXING DEVICE
Original Filed Aug. 24, 1922   2 Sheets-Sheet 1

Inventor
William C. Brumder
By Jabel + Mueller
attys.

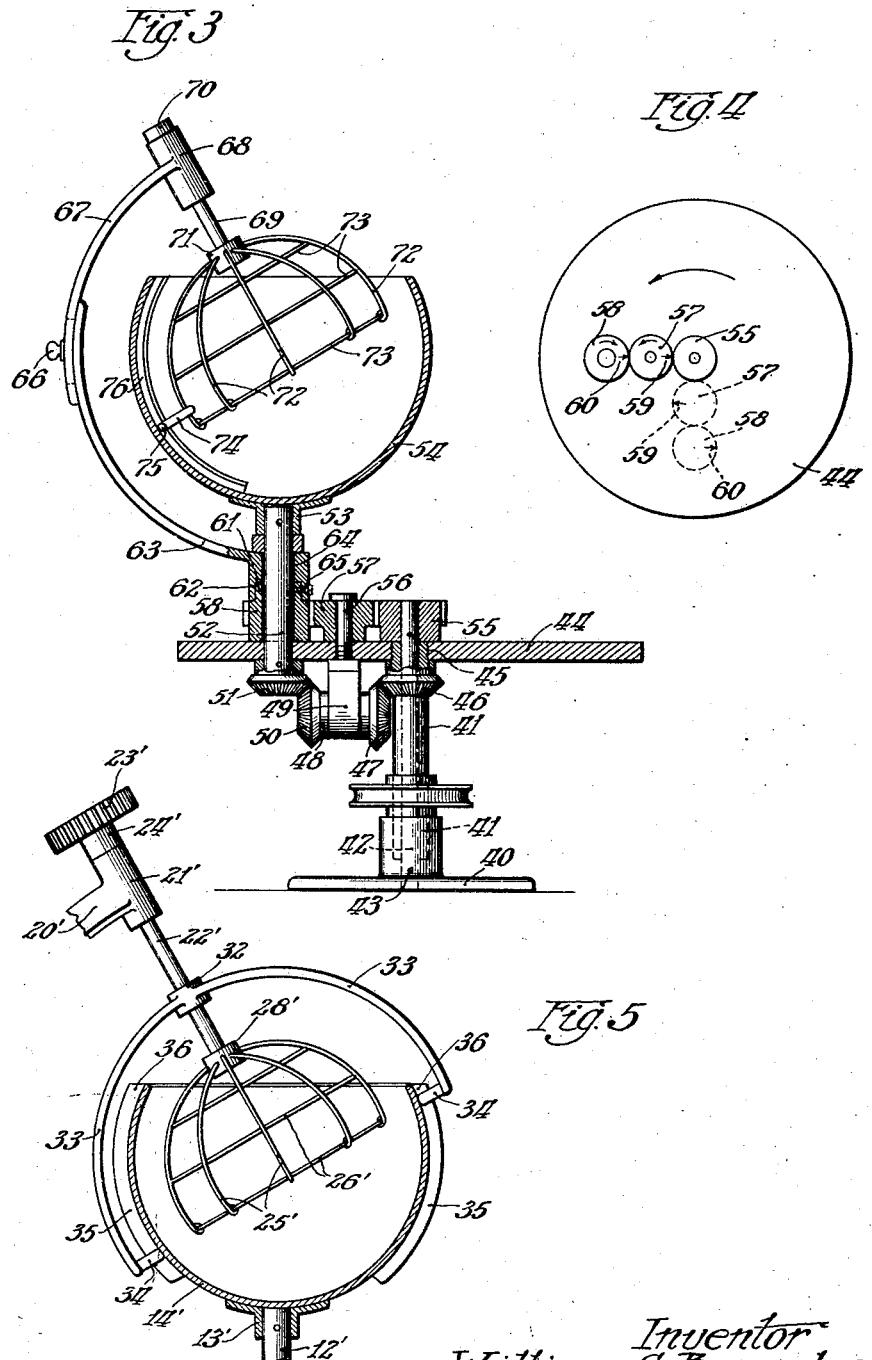

Patented Apr. 1, 1930

1,752,832

UNITED STATES PATENT OFFICE

WILLIAM C. BRUMDER, OF MILWAUKEE, WISCONSIN; THEKLA U. BRUMDER EXECUTRIX OF SAID WILLIAM C. BRUMDER, DECEASED

MIXING DEVICE

Application filed August 24, 1922, Serial No. 584,103. Renewed August 15, 1929.

My invention relates to mixing devices and more particularly to a mixing device comprising a pair of juxtaposed members rotatable about intersecting axes.

It is a purpose of the invention to provide a device of the above mentioned character which comprises an outer rotatable member and an inner rotatable member, said members being rotatable about intersecting axes at varying speeds of rotation. In certain forms of mixing devices it is desirable to provide for a variable speed of rotation for the agitating means relative to the container, and in order to provide for such a variation a new and improved driving arrangement is provided between the agitating device and the outer member, whereby the relative speed of the inner and outer members varies continuously from a predetermined maximum to a predetermined minimum and back to said maximum again with each revolution of the inner member.

It is a further purpose of the invention to provide means for adjusting the position of the axes of the two rotating members so as to vary the relative movements of the two members as desired. It may be desirable to provide, in addition to the action described, a centrifugal action in the mixing device which is obtained by rotation of the container about a fixed axis, and it is a purpose of the invention to provide a mixing device comprising inner and outer members rotatable about axes arranged at an angle to each other with a driving connection between the same, whereby the relative speed of the two members will vary continuously in cycles as described above, said means being mounted on a member that rotates about a fixed axis at a constant speed.

Other objects and advantages of the invention will appear as the description of the accompanying drawings proceeds. However, I desire to have it distinctly understood that I do not intend to limit myself to the exact details shown or described, but that I intend to include as part of my invention all such obvious changes and modifications of parts as would occur to a person skilled in this art and as would fall within the scope of the claims.

In the drawings:

Fig. 3 is a section similar to Fig. 1 of a modified form of the device;

Fig. 4 is a diagrammatic plan view of the construction shown in Fig. 3; and

Fig. 5 is a fragmentary view similar to Fig. 1 of a further modified form.

Figure 1:
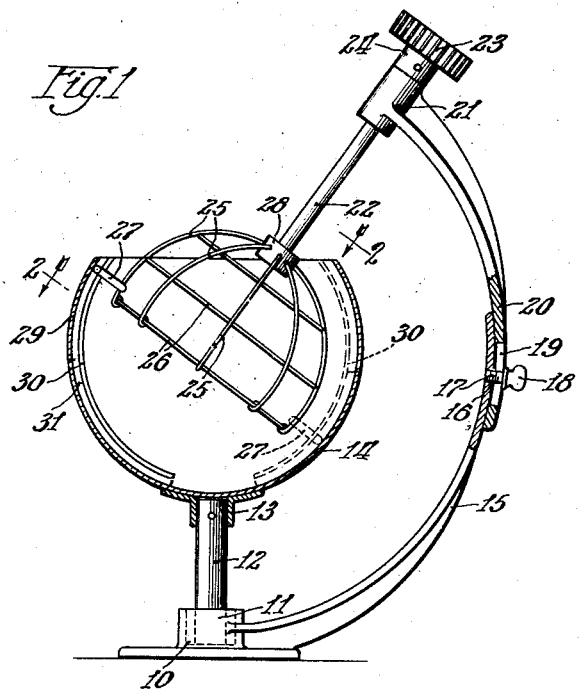
Fig. 1 is a view partly in side elevation and partly in vertical section of my improved mixing device.

Referring in detail to the drawings, in Fig. 1 is shown a base member 10 having a bearing 11 therein for a vertically extending shaft 12 to which is keyed the collar 13 upon which the bowl-like member 14 is mounted, which member is preferably substantially spherical in outline. The base member 10 is provided with an upwardly extending curved bracket 15 having an opening 16 therein for receiving an adjusting screw 17 having the enlarged head 18, said screw passing through a slot 19 in the bracket portion 20, whereby said bracket portion 20 can be adjusted relative to the portion 15. The upper end portion of the bracket 20 is provided with a bearing member 21 through which the shaft 22, having the gear 23 keyed to the end thereof, passes. The shaft 22 is preferably provided with a collar 24 between said gear and said bracket. Mounted on the lower end portion of the shaft 22 is an agitating member 28 of skeletonized spherical form comprising the meridian elements 25 and the connecting elements 26 lying in planes at right angles to the axis of rotation of said member. Rigidly secured to certain of said members 25 is the driving member 27 having the head 29 thereon, said head 29 being adapted to slide in the guide groove 30 provided between the guides 31 on the inner surface of the member 14, as clearly shown in Fig. 2.

It will be noted that the skeletonized spherical member and the outer spherical member have a common center of rotation, and accordingly the distance between the point of connection of the driving member 27 to the skeletonized member and the point where the same engages with the member 14 for the various positions thereon, will always be the same.

Figure 2:
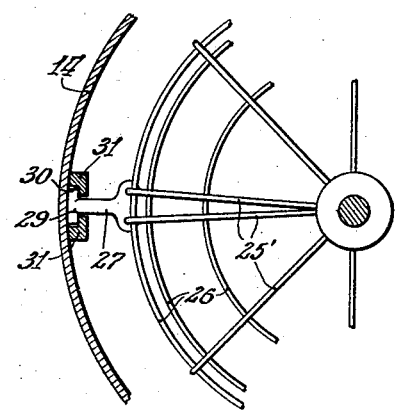
Fig. 2 is an enlarged sectional view thereof taken on the line 2—2 of Fig. 1.

It will be evident upon reference to Fig. 1 that as the gear 23 is rotated by any suitable driving means, the shaft 22 will be rotated, rotating the member comprising the meridian elements 25. The member 14 being mounted for rotation relative to the base 10 with the shaft 12 it will be seen that as the spider-like or skeletonized hemispherical member rotates, the member 14 will be rotated through the driving connection 27, but it will be seen that due to the fact that the head 29 will travel up and down in the guideway 30, thus causing the driving member to engage with the bowl-like member at varying distances from the center thereof, the speed of rotation of the member 14 will vary, depending on whether the same is being driven from a point near to or far away from the axis of rotation thereof. The speed of rotation will be the greatest when the driving connection is engaging with the guideway near the axis of rotation, and will be the least when it is engaging with the guideway at the greatest distance from the axis of rotation. A variation in speed accordingly takes place which is continuously changing, but which is not uniformly accelerated or uniformly retarded, the acceleration varying also continuously due to the fact that the end of the driving member travels in a curved path. By providing the adjustable connection comprising the screw 17 and the slot 18, the angle of the shaft 22 relative to the shaft 12 can be varied, thus varying the cycle of the relative speeds of rotation of the inner and outer members of the device. It will be evident that while the inner member in the form shown in Figs. 1 and 2 is rotated at a constant speed, yet relative to the outer member or container 14, the agitating device will be rotated at a constantly changing speed, the changes taking place in cycles as described above.

It will be noted that the curvature of the members 15 and 20 at the sliding joint is such that its center of curvature is the center of rotation of the inner and outer spherical members, thus the adjustment made at such sliding joint will maintain the inner spherical member concentric with the outer spherical member.

In Fig. 5 a slightly modified form of the device is shown, in which the shaft 12' is mounted in a similar manner to the shaft 12 and is secured to the member of spherical outline 14' in a manner similar to that in which the member 14 is secured to the shaft 12 by means of the member 13'. The shaft 22' is mounted in a bearing 21' in the bracket portion 20' corresponding to the bracket 20 shown in Fig. 4, and is driven by a gear 23', a collar 24' being provided as in Fig. 1. The agitating member 28' comprises the meridian elements 25' and the connecting elements 26' in this form corresponding to the member 28 in Fig. 1. In this form, however, the driving connection is so made that the same will not be inside the bowl-like member 14, thus providing a more sanitary device. The driving connection comprises a collar 32 keyed to the shaft 22' and having the curved arm portions 33 the ends of which are provided with lugs or pins 34 that are arranged substantially diametrically opposite each other and which are adapted to operate in the guide grooves 35 provided between the driving members 36, corresponding to the members 31 in Fig. 1.

In Figs. 3 and 4 another form of the device is shown comprising a base member 40 having a tubular or hollow shaft 41 journaled therein, said shaft 41 having a stationary shaft 42 extending therethrough, said shaft 42 being keyed to the base 40 by means of the member 43 and said hollow shaft 41 being secured to the turntable 44 so as to rotate the same in any suitable manner, as by means of the threaded connection at 45. The shaft 41 is also provided with a beveled gear 46 meshing with the gear 47 on the stub shaft 48 journaled in the bracket 49 secured to the under side of the member 44, the opposite end of the shaft 48 being provided with a beveled gear 50 which meshes with the beveled gear 51 keyed to the shaft 52, said shaft 52 corresponding somewhat to the shaft 12 shown in Fig. 1 and having the collar 53 keyed thereto, said collar being secured to the bowl-like member 54 having a substantially spherical surface. Keyed to the stationary shaft 42 is the stationary gear 55, and mounted to rotate about the shaft 56, which is secured in any suitable manner on the turntable 44, is the gear 57 corresponding in size and number of teeth to the gear 55.

Mounted to rotate on the shaft 52 is the gear 58, said gear 58 meshing with the gear 57 and being of the same size and having the same number of teeth as said gear 57. The gears 55, 57 and 58 are shown diagrammatically in Fig. 4, and it will be evident that the gear 57 will rotate around the gear 55 as the turntable 44 rotates and that if the turntable is assumed to rotate in the direction of the arrow provided thereon, the gears 57 and 58 will rotate in the direction of the curved arrows provided on said gears.

It will also be seen that as a quarter of a turn is made, as shown in Fig. 4, the point on the gear 57 indicated by the arrow 59, will move to the dotted position shown for the same in said figure. The gear 58 will also rotate a quarter of a turn to a quarter of a revolution of the turntable 44 and the point indicated on the gear 58 by the arrow 60 will assume the dotted position shown therefor in Fig. 4. It will be seen that relative to the base 40 or the fixed gear 55 there has been no rotation of the gear 58 about its own axis but only a rotation of said gear 58 about the axis of the gear 55. The gear 58 is provided with an upstanding extension 61 which is adapted to receive a socket member 62 on the bracket 63 which has an opening 64 therein through which the shaft 52 passes, and which is secured to the boss 61 by means of a bolt or other securing means 65 so that the brackets 63 will move with the gear 58. The bracket 63 corresponds to the bracket 15 in Fig. 1, and is provided with a sliding joint at 66 for connecting the same with the bracket member 67, said sliding joint being similar to that provided at 17 between the members 15 and 20. Journaled in a bearing 68 provided on the member 67 is the shaft 69 having a head 70 thereon to prevent the same from dropping downwardly. The shaft 69 is provided with an agitating device 71 having the meridian elements 72 and the connecting members 73 lying in a plane perpendicular to the axis of rotation of the member 71. A driving connection 74 is provided between said members 71 and the bowl-like member 54, said driving connection being similar to the connection 27 and having a head 75 thereon operating in a guideway 76 in the bowl-like member 54.

It will be seen that as the bowl-like member 54 is rotated at a constant speed through the gearing described above from the hollow shaft 41, the member 71 comprising the meridian elements 72 will be driven through the driving member 74 at a constantly varying speed, the variations occurring in cycles as previously described, due to the fact that the head 75 on the driving connection will be in engagement with various portions of the guideway 76 as the member 54 rotates, thus assuming positions nearer to and further away from the axis of rotation of said bowl-like member 54, depending upon the position of the member 75 in the guideway.

It will be evident from Fig. 4 that the rotation of the turntable 44 will not in any way affect the movement of the member 71 relative to the member 54, as there is no rotation of the member 58 relative to the axis 52, the only other effect produced in the bowl-like member 54 by the rotation of the turntable 44 being due to rotation of the member 58 about the axis of the turntable 44 thus producing a simple centrifugal action in addition to the agitating action produced by the skeletonized agitating member 71.

Having thus described my invention, what I desire to claim and secure by U. S. Letters Patent is:

1. Apparatus of the character described comprising a pair of juxtaposed bodies rotatable upon intersecting axes, one of said bodies consisting of a framework the elements of which lie on the surface of a sphere and comprising a plurality of partially circular meridian elements.

2. Apparatus of the character described comprising a pair of juxtaposed bodies rotatable upon intersecting axes, one of said bodies consisting of a framework the elements of which lie on the surface of a sphere and comprising a plurality of partially circular meridian elements, and a plurality of parallel circumferentially arranged elements associated with said meridian elements.

3. Apparatus of the character described comprising a pair of juxtaposed bodies rotatable upon intersecting axes, one of said bodies consisting of a framework the elements of which lie on the surface of a sphere and comprising a plurality of partially circular meridian elements, and the other of said bodies consisting of a bowl, the inner face of said bowl having a spheroidal surface.

4. Apparatus of the character described comprising a pair of juxtaposed bodies rotatable upon intersecting axes, one of said bodies consisting of a framework the elements of which lie on the surface of a sphere and comprising a plurality of partially circular meridian elements, and a plurality of parallel circumferentially arranged elements associated with said meridian elements and the other of said bodies consisting of a bowl.

5. Apparatus of the character described comprising a pair of juxtaposed bodies rotatable upon intersecting axes, a connection arranged between the bodies themselves whereby one of said bodies drives the other body, one of said bodies consisting of a spherical framework having meridian elements as parts of said framework.

6. Apparatus of the character described comprising a pair of juxtaposed bodies rotatable upon intersecting axes, a connection arranged between the bodies themselves whereby one of said bodies drives the other body, one of said bodies consisting of a spherical framework having meridian elements as parts of said framework, and a plurality of parallel circumferentially arranged elements associated with said meridian elements.

7. Apparatus of the character described comprising a pair of juxtaposed bodies rotatable upon intersecting axes, a connection arranged between the bodies themselves whereby one of said bodies drives the other body, one of said bodies consisting of a framework having an outline of a portion of a sphere and having meridian elements as parts of said framework, and the other of said bodies consisting of a bowl.

8. Apparatus of the character described comprising a pair of juxtaposed bodies rotatable upon intersecting axes, a connection arranged between the bodies themselves whereby one of said bodies drives the other body, one of said bodies consisting of a framework having an outline of a portion of a sphere and having meridian elements as parts of said framework, and a plurality of parallel circumferentially arranged elements associated with said meridian elements and the other of said bodies consisting of a bowl.

9. Apparatus of the character described comprising a pair of juxtaposed bodies having outlines of portions of spheres rotatable upon intersecting axes, one of said bodies consisting of a framework having elements curved in a plurality of directions on the outline of a portion of a sphere, certain of said elements being interrupted circular meridian elements.

10. Apparatus of the character described comprising a pair of juxtaposed bodies having outlines of portions of spheres rotatable upon intersecting axes, one of said bodies consisting of a framework, all the elements of said framework lying on the surface of a sphere and comprising interrupted circular meridian elements, and a plurality of parallel circumferentially arranged elements associated with said meridian elements.

11. Apparatus of the character described comprising a pair of juxtaposed bodies having outlines of portions of spheres rotatable upon intersecting axes, one of said bodies consisting of a framework, all the elements of said framework lying on the surface of a sphere and comprising meridian elements, and the other of said bodies consisting of a bowl.

12. Apparatus of the character described comprising a pair of juxtaposed bodies having outlines of portions of spheres rotatable upon intersecting axes, one of said bodies consisting of a framework, all the elements of said framework lying on the surface of a sphere and comprising interrupted circular meridian elements, and a plurality of parallel circumferentially arranged elements associated with said meridian elements and the other of said bodies consisting of a bowl.

13. A device of the character described, comprising a pair of substantially concentrically curved rotatable members, one of said members being mounted within the other thereof, said members being rotatable about axes extending at an angle to each other, and said inner member comprising a spherical framework having meridian elements, the relative speed of rotation of said member varying continuously as said members rotate.

14. A device of the character described, comprising a pair of substantially concentrically curved rotatable members, one of said members being mounted within the other thereof, said members being rotatable about axes extending at an angle to each other, one of said members rotating at a constant speed and a driving connection whereby the other of said members is driven from said first mentioned member at a speed relative thereto that varies continuously in cycles as said members rotate.

15. A device of the character described comprising a rotatable bowl-like member, an agitating member within said bowl-like member, said agitating member rotating about an axis extending at an oblique angle to the axis of rotation of said bowl-like member, one of said members rotating at a constant speed, and interconnecting means whereby the other of said members is rotated at a variable speed by the member rotating at a constant speed.

16. Apparatus of the character described comprising an inner rotatable member and an outer member, said outer member having a spheroidal inner surface and said inner member consisting of elements that are correspondingly curved about substantially the same center and rotate closely adjacent said surface, whereby said surfaces interact at the adjoining portions thereof as said inner member rotates, and means for fixedly adjusting the axis of said inner member angularly about the center of said members.

17. Apparatus of the character described comprising a pair of juxtaposed substantially concentrically curved bodies rotatable upon intersecting axes, one of said bodies consisting of a framework, the elements of which lie on the surface of a sphere and comprising meridian elements, and means for adjusting the angularity of said axes.

18. Apparatus of the character described comprising a pair of juxtaposed substantially concentrically curved bodies rotatable upon intersecting axes, one of said bodies consisting of a framework, the elements of which lie on the surface of a sphere and comprising meridian elements and a plurality of parallel circumferentially arranged elements associated with said meridian elements, and means for adjusting the angularity of said axes.

19. Apparatus of the character described comprising a pair of juxtaposed substantially concentrically curved bodies rotatable upon intersecting axes, a connection arranged between the bodies themselves whereby one of said bodies drives the other body, one of said bodies consisting of a spherical framework having meridian elements as parts of said framework and means for adjusting the angularity of said intersecting axes.

20. Apparatus of the character described comprising a pair of juxtaposed substantially concentrically curved bodies having outlines of portions of spheres rotatable upon intersecting axes, one of said bodies consisting of a framework having elements curved in a plurality of directions on the outline of a portion of a sphere, certain of said elements being meridian elements and means for adjusting the angularity of said intersecting axes.

In witness whereof, I hereunto subscribe my name this 19th day of June A. D. 1922.

WILLIAM C. BRUMDER.